United States Patent
Wen et al.

(10) Patent No.: US 8,924,435 B1
(45) Date of Patent: Dec. 30, 2014

(54) TRANSFERRING VALUES AMONG FIELDS IN DATA STRUCTURES

(75) Inventors: Jianjun Wen, San Jose, CA (US); Xinyu Tang, Cupertino, CA (US)

(73) Assignee: Google Inc., Mountain View, CA (US)

( * ) Notice: Subject to any disclaimer, the term of this patent is extended or adjusted under 35 U.S.C. 154(b) by 172 days.

(21) Appl. No.: 13/069,976

(22) Filed: Mar. 23, 2011

(51) Int. Cl.
    *G06F 17/30* (2006.01)
(52) U.S. Cl.
    USPC .......................................................... 707/809
(58) Field of Classification Search
    USPC ................................................ 707/809, 999.1
    See application file for complete search history.

(56) References Cited

U.S. PATENT DOCUMENTS

| | | | | |
|---|---|---|---|---|
| 4,543,627 A | * | 9/1985 | Schwab | 709/212 |
| 5,987,504 A | * | 11/1999 | Toga | 709/206 |
| 6,199,195 B1 | * | 3/2001 | Goodwin et al. | 717/104 |
| 6,327,608 B1 | * | 12/2001 | Dillingham | 709/203 |
| 6,343,302 B1 | * | 1/2002 | Graham | 715/205 |
| 7,010,796 B1 | * | 3/2006 | Strom et al. | 719/328 |
| 7,281,252 B1 | * | 10/2007 | Lindquist et al. | 719/332 |
| 7,568,204 B1 | * | 7/2009 | Hudis et al. | 719/330 |
| 2004/0187141 A1 | * | 9/2004 | Tobin | 719/330 |
| 2004/0203367 A1 | * | 10/2004 | Nowlin | 455/41.2 |
| 2005/0010919 A1 | * | 1/2005 | Ramanathan et al. | 717/174 |
| 2006/0130152 A1 | * | 6/2006 | Katoh et al. | 726/29 |
| 2006/0179070 A1 | * | 8/2006 | George et al. | 707/100 |
| 2009/0063442 A1 | * | 3/2009 | Gaurav et al. | 707/5 |

\* cited by examiner

*Primary Examiner* — Shiow-Jy Fan
(74) *Attorney, Agent, or Firm* — Fish & Richardson P.C.

(57) ABSTRACT

A computer-implemented method includes receiving a request to populate one or more first fields of a first data structure with one or more first values that are at least partly based on one or more second values in one or more second fields of a second data structure; generating, based on the request, one or more instructions to (i) select the one or more second values, (ii) generate the one or more first values, and (iii) populate the one or more first fields of the first data structure with the one or more first values; and sending the one or more instructions to a computing device for insertion into a computer program that is executable by the computing device.

16 Claims, 4 Drawing Sheets

FIG. 4

TRANSFERRING VALUES AMONG FIELDS IN DATA STRUCTURES

TECHNICAL FIELD

This disclosure relates generally to transferring values among fields in data structures.

BACKGROUND

A computer program can be written to store data in a field of a data structure. In an example, a developer of the computer program may want to copy a value in a field of the data structure to another field in another, different data structure.

SUMMARY

In one aspect of the present disclosure, a computer-implemented method includes receiving a request to populate one or more first fields of a first data structure with one or more first values that are at least partly based on one or more second values in one or more second fields of a second data structure; generating, based on the request, one or more instructions to (i) select the one or more second values, (ii) generate the one or more first values, and (iii) populate the one or more first fields of the first data structure with the one or more first values; and sending the one or more instructions to a computing device for insertion into a computer program that is executable by the computing device.

Implementations of the disclosure can include one or more of the following features. In some implementations, the method also includes determining a syntax for the request, wherein the syntax includes a keyword that uniquely identifies the request. In other implementations, the method also includes detecting the keyword in the request; and following detection of the keyword, generating the one or more instructions.

In still other implementations, the one or more instructions to generate and to populate include one or more instructions to transfer the one or more second values to the one or more first fields of the first data structure, and the method further includes: following an execution of the computer program by the computing device: selecting the one or more second values in the one or more second fields of the second data structure; and transferring the selected one or more second values to the one or more first fields of the first data structure. The method may also include performing one or more operations on the selected one or more second values, prior to transfer to the one or more first fields of the first data structure.

In some implementations, the one or more operations include one or more of a copy operation, a read operation, a write operation, or an operation that generates a derivative value of the selected one or more second values. The method may also include generating, using a library of syntaxes, the one or more instructions in accordance with a syntax of a pre-defined programming language.

In other implementations, the first data structure includes a first protocol buffer and wherein the second data structure includes a second protocol buffer that is different from the first protocol buffer. In still other implementations, the receiving, the generating and the sending are performed by one or more processors on a server-side device.

In another aspect of the disclosure, a computer-implemented method includes sending a request to transfer (i) one or more values in one or more first fields of a first data structure to (ii) one or more second fields of a second data structure; receiving one or more instructions to (i) select the one or more values, and (ii) transfer the one or more values to the one or more second fields of the second data structure; inserting the one or more instructions into a computer program; and executing the computer program with the one or more instructions.

In still another aspect of the disclosure, one or more machine-readable media are configured to store instructions that are executable by one or more processing devices to perform operations including receiving a request to populate one or more first fields of a first data structure with one or more first values that are at least partly based on one or more second values in one or more second fields of a second data structure; generating, based on the request, one or more instructions to (i) select the one or more second values, (ii) generate the one or more first values, and (iii) populate the one or more first fields of the first data structure with the one or more first values; and sending the one or more instructions to a computing device for insertion into a computer program that is executable by the computing device. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving a request to populate one or more first fields of a first data structure with one or more first values that are at least partly based on one or more second values in one or more second fields of a second data structure; generating, based on the request, one or more instructions to (i) select the one or more second values, (ii) generate the one or more first values, and (iii) populate the one or more first fields of the first data structure with the one or more first values; and sending the one or more instructions to a computing device for insertion into a computer program that is executable by the computing device. Implementations of this aspect of the present disclosure can include one or more of the foregoing features.

In yet another aspect of the disclosure, an electronic system includes means for receiving a request to populate one or more first fields of a first data structure with one or more first values that are at least partly based on one or more second values in one or more second fields of a second data structure; means for generating, based on the request, one or more instructions to (i) select the one or more second values, (ii) generate the one or more first values, and (iii) populate the one or more first fields of the first data structure with the one or more first values; and means for sending the one or more instructions to a computing device for insertion into a computer program that is executable by the computing device. Implementations of this aspect of the present disclosure can include one or more of the foregoing features.

Advantages of the present disclosure include one or more of the following. One advantage is that software code is automatically generated to transfer fields between protocol buffers. Rather than manually writing software code to transfer fields among protocol buffers, a software engine can generate a file to specify how fields from a first protocol buffer populate a second protocol buffer.

A graphical user interface can be used to generate the file. Another advantage of the present disclosure is that the graphical user interface can specify and visually display the fields of a protocol buffer that are available to be to transferred between protocol buffers. Accordingly, software engineers are able to quickly and easily generate code for the population of fields within a protocol buffer. The system described herein then uses the file to generate the software code that when executed by a computing device transfers the fields between the protocol buffers.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols and designations in the various drawings indicate like elements.

DETAILED DESCRIPTION

A system consistent with this disclosure generates instructions for transferring a value among fields in data structures, including protocol buffers and other types of data structures (e.g., arrays, lists, binary trees, hashes, graphs, and the like). While some of the below techniques are described with regard to protocol buffers, the below techniques are equally application to other types of data structures.

In an example, a protocol buffer includes a data structure that stores data according to a serialization format. Generally, a serialization format includes a definition of how to convert data from an original format into a compressed format for storage. Generally, a data structure includes a pre-defined format for organizing and/or for storing data. The data stored in the protocol buffer can be restored to its original format by reversely applying the serialization format to decompress the data.

The protocol buffer can include an interface that is based on an interface description language ("IDL"). Generally, an IDL includes a software language for generating an interface that is language-neutral. IDL promotes communication between two software components that can be written in different languages, for example, between a component written in the C++® programming language and a component written in the Java® programming language. Through an IDL-based interface, the protocol buffer can be accessed by software components written in different languages.

The protocol buffer can include fields for the storage of data. A field can include an element of a data structure in which one or more items of data are stored. A field of a protocol buffer can be populated with a value, for example, when data is stored in the field.

A transfer can include selecting a value in a field of a protocol buffer and populating another field of another protocol buffer with another value that is at least partly based on the selected value. In an example, a transfer includes copying a value in a field of a protocol buffer to another field in another protocol buffer. In another example, a transfer includes selecting a value in a field of a protocol buffer and populating another field in another protocol buffer with a value derived from the selected value, for example, as described in further detail with regard to FIG. 1. In still another example, a transfer includes performing a read operation and/or performing a write operation.

In an example, a transfer of a value among fields in protocol buffers can be initiated following detection of a transfer request. A transfer request can include a request to transfer a value among fields in protocol buffers. In an example, a user writes a software program that performs an operation (e.g., a multiplicative operation) on a value stored in a protocol buffer. In this example, to perform the operation, the software program needs to transfer the value stored in the protocol buffer to another protocol buffer that is accessible by the software program. To do so, a transfer request is generated to transfer the value from one protocol buffer to the protocol buffer that is accessible by the computer program.

In another example, the system can define a syntax for the transfer request. A syntax can include rules regarding the format of a request and rules regarding the terms that can be used in the request.

In an example, the system can receive, from a client device, information, including, e.g., a transfer request. The system can parse the information and can determine that at least part of the information is in compliance with the syntax for a transfer request. Using the syntax of the transfer request, the system can determine the values of fields in a protocol buffer that are to be transferred to fields in another protocol buffer, e.g., as described in FIG. 1. The system can generate instructions to cause the determined values of fields in the protocol buffer be transferred to fields in the other protocol buffer. In an example, the generated instructions can be inserted into a computer program that is executable by a computer system. In this example, execution of the instructions can cause the determined values of fields in the protocol buffer to be transferred to fields in the other protocol buffer.

Figure 1:
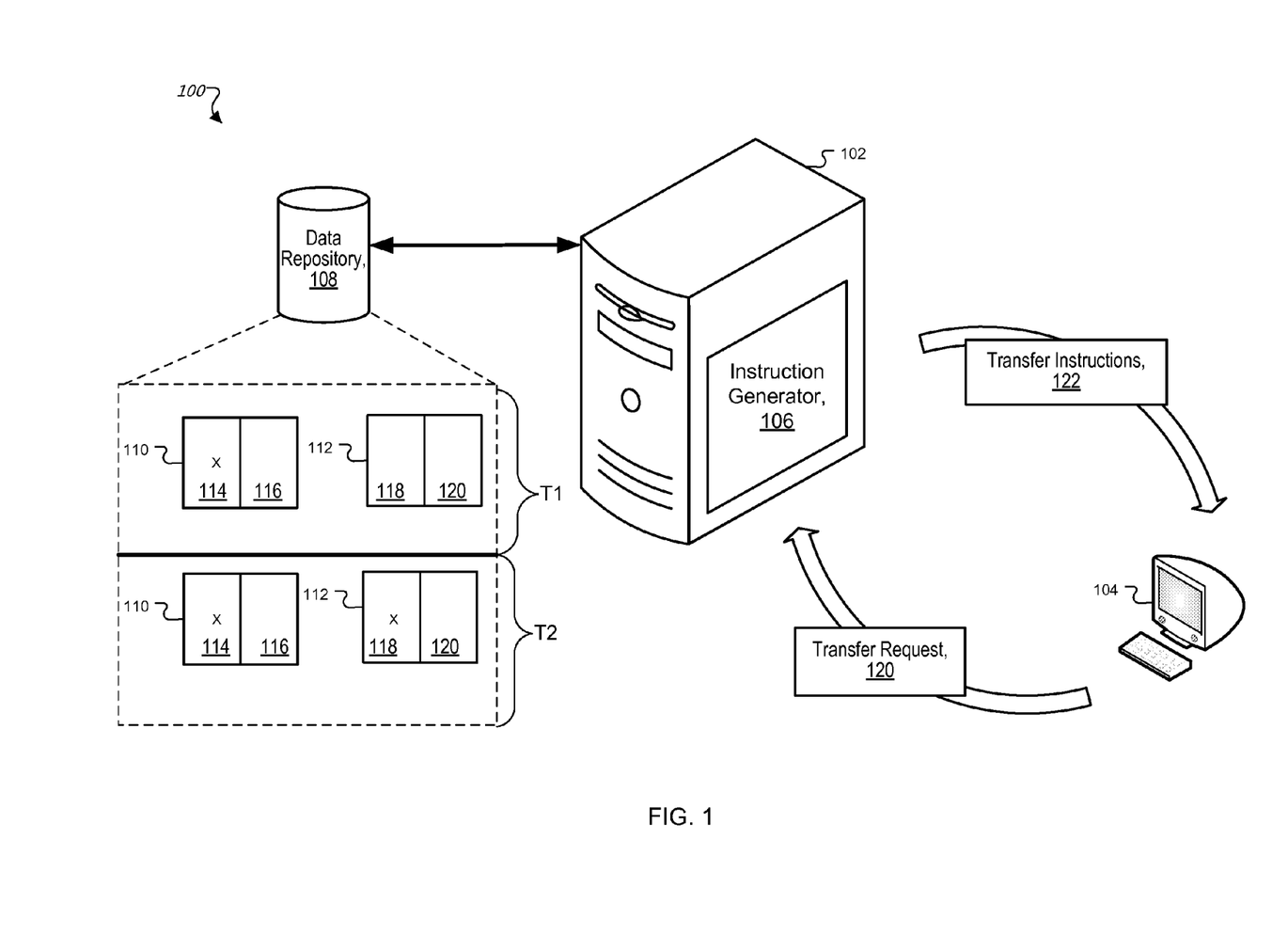
FIG. 1 is a conceptual diagram of an example of a system that generates transfer instructions for the transfer of values among fields in protocol buffers.

FIG. 1 is a conceptual diagram of an example system 100 that generates transfer instructions for the transfer of values among fields in protocol buffers. System 100 includes server 102 and client device 104. Server 102 includes instruction generator 106 that can generate instructions to cause a value of a field in one protocol buffer be transferred to a field in another protocol buffer.

System 100 also includes data repository 108 that can store one or more data structures 110, 112, including, e.g., protocol buffers. Data structure 110 includes fields 114, 116 that store data. Data structure 112 includes fields 118, 120 that store data. Data structures 110, 112 can be accessed by various components of system 100, including, e.g., data repository 108, instruction generator 106, and client device 104. In the illustrative example of FIG. 1, data structure 110 differs from data structure 112. In an example, data structures 110, 112 can differ by having different fields that are used to store different types of data and/or data with different values.

In an example, data structures 110, 112 can include a data structure with a pre-defined format for the storage of data. In this example, data structures 110, 112 can provide a stable, compressible, backward compatible framework for the storage of data. In this example, data structures 110, 112 can be used for the transfer of data, where transferring data includes transferring data between clients and servers, between servers, between processes, between different storage devices, and the like.

In another example, data structures 110, 112 can be defined from source code associated with several programming languages. In still another example, data structures 110, 112 can define a data structure which can be instantiated with different data values. Additionally, numerous, different protocol buffer definitions can exist. For example, a protocol buffer definition can define a protocol buffer that is nested within another protocol buffer. Another protocol buffer definition can define a protocol buffer that includes other protocol buffers as its fields.

In the illustrative example of FIG. 1, at a first point in time ("T1"), field 114 in data structure 110 includes a value of "x." At T1, field 116 in data structure 110 and fields 118, 120 in data structure 112 are not populated with values. At a second point in time ("T2"), for example, following execution of instructions to transfer the value of field 114 in data structure 110 to field 118 in data structure 112, field 118 in data structure 112 is populated with the value of "x." Additionally, at T2, field 114 in data structure 110 remains populated with the value of "x." At T2, field 116 in data structure 110 and field 120 in data structure 112 remain unpopulated with a value.

Although FIG. 1 depicts various elements, system 100 can include fewer or more elements than what is shown, and functionality of the depicted elements can overlap and/or exist in fewer or more elements.

In the example of FIG. 1, client device 104 can send transfer request 120 to server 102. Transfer request 120 includes a request to transfer the value (e.g., "x") for field 114 in data structure 110 to field 118 in data structure 112. Using the syntax of transfer request 120, instruction generator 106 can generate transfer instructions 122. Transfer instructions 122 can include instructions that specify a value in a field of a protocol buffer to be transferred to another field in another protocol buffer.

In an example, transfer instructions 122 include instructions to transfer the value ("x") for field 114 in data structure 110 to field 118 in data structure 112. Server 102 can send transfer instructions 122 to client device 104. Transfer instructions 122 can include instructions that are executable in a particular programming language, including, e.g., the C++® programming language, the Java® programming language, the Python® programming language, and the like, as described in further detail below.

At client device 104, transfer instructions 122 can be inserted into a computer program. The insertion of transfer instructions 122 into the computer program can be manually performed by a user of client device 104. In another example, client device 104 can include an application (not shown) that can generate transfer request 120. In this example, the user of client device 104 can enter into the application information specifying a location within the computer program for the insertion of transfer instructions 122. The application can insert transfer instructions 122 into the identified location in the computer program, for example, following receipt of transfer instructions 122 by client device 104.

As previously described, a syntax of a transfer request includes rules regarding the format of the request and rules regarding the terms that can be used in the request. In an example, the syntax of transfer request 120 includes (i) a syntax keyword, (ii) syntax operations, (iii) a syntax structure, and (iv) syntax fields, each of which are described below.

The syntax keyword includes a word that uniquely identifies information as a transfer request. In an example, the syntax keyword includes a word that triggers the generation of transfer instructions 122 by instruction generator 106. In an example, instruction generator 106 can receive information from client device 104. Instruction generator 106 can parse the information for the syntax keyword. When instruction generator 106 detects the syntax keyword in the received information, instruction generator 106 can recognize the received information as a transfer request.

In an example, the syntax keyword includes the words "Message Transfer." In this example, transfer request 120 includes the "Message Transfer" syntax keyword. Instruction generator 106 can detect the occurrence of the "Message Transfer" syntax keyword in transfer request 120. Following detection of the "Message Transfer" syntax keyword in transfer request 120, instruction generator 106 can use the syntax of transfer request 120 to generate transfer instructions 122.

The syntax of a transfer request also can include syntax operations. Syntax operations can include the functions that can be performed by instruction generator 106 in transferring values of fields among protocol buffers. In an example, a syntax operation includes a multiplicative function, in which a multiplicative value is generated by multiplying a value of a field in a protocol buffer by a pre-defined value. In this example, a field in another protocol buffer can be populated with the multiplicative value. In another example, a syntax operation includes an additive function, in which an additive value can be generated by adding a value of a field in a protocol buffer to a pre-defined value. In this example, a field in another protocol buffer can be populated with the additive value.

In still another example, a syntax operation can include a conditional function, in which a value of a field can be transferred from one protocol buffer to another protocol buffer when the value of the field satisfies pre-defined criteria. In this example, the conditional function specifies that a value of a field in a protocol buffer can be copied into a field in another protocol buffer when the value is greater than a pre-defined value. In yet another example, a syntax operation includes functions that are defined by various programming languages, including, e.g., the C++® programming language, the Java® programming language, the Python® programming language, and the like.

The syntax structure can include information specifying an arrangement of information within transfer request 120. In an example, the syntax structure specifies that transfer request 120 includes a header section and a body section. In this example, the header section includes information to be imported from a programming language, for example, when a syntax operation being used in transfer request 120 is defined by a programming language, as described above. The header section also can include information specifying a programming language for which transfer instructions 122 are written.

The body section can include information specifying the syntax fields and the syntax operations. The syntax fields can include information specifying an identity of a field within a protocol buffer from which a value is selected for transfer to a field in another protocol buffer. The syntax fields also can include information specifying an identity of a field within a protocol buffer into which the selected value is to be transferred. The "Message Transfer" syntax keyword also can be associated with syntax fields, namely, information specifying a field in a protocol buffer from which a value is selected and another field in another protocol buffer into which the selected value is transferred.

In an example, transfer request 120 can include a syntax keyword, a syntax operation, a syntax structure, and syntax fields, as illustrated in the below Table 1. Table 1 is related to an example implementation consistent with this disclosure, in which data structure 110 is referred to as protocol buffer 110 and data structure 112 is referred to as protocol buffer 112.

TABLE 1

MessageTransfer From_ProtocolBuffer110 To_ProtocolBuffer 112{
<header> C++ </header>
<body>
ProtocolBuffer112.field118 = ProtocolBuffer110.field114;
</body>
}

As illustrated in the above Table 1, transfer request 120 can include the "MessageTransfer" syntax keyword. Additionally, transfer request 120 includes syntax fields, namely, "From_ProtocolBuffer110" and "To_ProtocolBuffer 112." The "From_ProtocolBuffer110" syntax field specifies the identity of the protocol buffer (e.g., "Protocol Buffer 110") from which a value of a field is selected. The "To_ProtocolBuffer 112" syntax field specifies the identity of the protocol buffer (e.g., "Protocol Buffer 112") into which the selected value from protocol buffer 110 is transferred.

Transfer request 120 also can include the syntax structure of a header section, which is illustrated in Table 1 by the "<header>" and "</header>" identifiers. In this example, the header section specifies that transfer instructions 122 are generated by instruction generator 106 in the C++® programming language.

The syntax structure of transfer request 120 also can include a body section, which is illustrated in Table 1 by the "<body>" and "</body>" identifiers. The body section of transfer request 120 includes additional syntax fields, namely, "ProtocolBuffer112.field118" and "ProtocolBuffer110.field114," which are described in further detail below.

The body section of transfer request 120 also can include a syntax operation specifying how one value of a field in a protocol buffer is transferred to another field in another protocol buffer. In the example of Table 1, the syntax operation includes a copy instruction, as specified by the "=" symbol in the foregoing Table 1. The copy instruction specifies that a value of a field in a protocol buffer is copied to another field in another protocol buffer. In the example of Table 1, the syntax fields and syntax operation of "ProtocolBuffer112.field118=ProtocolBuffer110.field114" specify that the value of field 114 in protocol buffer 110 is copied to field 118 in protocol buffer 112.

Using the syntax keyword, the syntax fields, the syntax operation, and the syntax structure of transfer request 120, instruction generator 106 can generate transfer instructions 122. In this example, transfer instructions 122 include the instructions illustrated in the below Table 2. Table 2 is related to an example implementation consistent with this disclosure, in which data structure 110 is referred to as protocol buffer 110 and data structure 112 is referred to as protocol buffer 112.

TABLE 2

ProtocolBuffer110_ProtocolBuffer 112::copy(const ProtoBuffer110& from, ProtocolBuffer112& to){
  if(from.field114_size( )>0){
    to.set_field120(from.field114);
  }
}

As illustrated in the above Table 2, transfer instructions 122 include the instructions of "ProtocolBuffer110_ProtocolBuffer 112::copy(const ProtoBuffer110& from, ProtocolBuffer112& to)." These instructions specify that the value (e.g., "x") in field 114 in protocol buffer 110 is to be copied to field 118 in protocol buffer 112. Additionally, transfer instructions 122 include a conditional statement, namely, "if(from.field114_size( )>0)." The conditional statement specifies that the value (e.g., "x") of field 114 in protocol buffer 110 is copied to field 118 in protocol buffer 112 when the value of field 114 in protocol buffer 110 is greater than zero. When this conditional statement is true, the value (e.g., "x") of field 114 in protocol buffer 110 is copied to field 118 in protocol buffer 112, as specified in Table 2 by the instructions of "to.set_field120(from.field114)".

Figure 2:
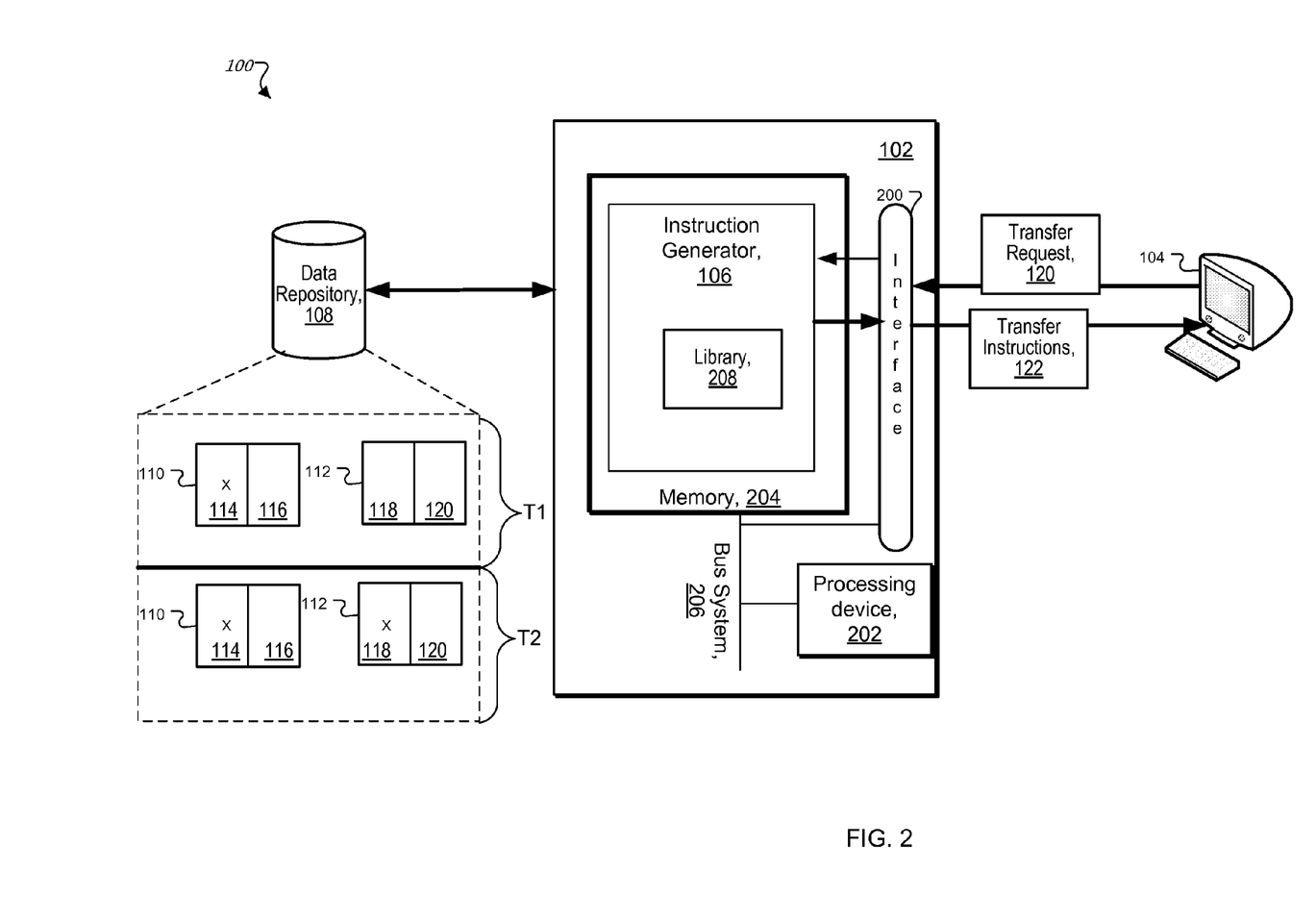
FIG. 2 is a block diagram showing examples of components of a system that generates transfer instructions for the transfer of values among fields in protocol buffers.

FIG. 2 is a block diagram of example components of example system 100 that generates transfer instructions 122 for the transfer of values among fields in protocol buffers.

Client device 104 can be any computing device capable of taking input from a user and communicating over a network (not shown) with server 102 and/or with other client devices. For example, client device 104 can be a mobile device, a desktop computer, a laptop, a cell phone, a personal digital assistant ("PDA"), a server, an embedded computing system, a mobile device and the like. Although a single client device 104 is shown in FIGS. 1 and 2, system 100 can include a plurality of client devices, which can be geographically dispersed.

Server 102 can be any of a variety of computing devices capable of receiving information and running one or more services, which can be accessed by client device 104. In an example, server 102 can include a server, a distributed computing system, a desktop computer, a laptop, a cell phone, a rack-mounted server, and the like. Server 102 can be a single server or a group of servers that are at a same location or at different locations. Client device 104 and server 102 can run programs having a client-server relationship to each other. Although distinct modules are shown in the figures, in some examples, client and server programs can run on the same device.

Server 102 can receive information from client device 104 via input/output ("I/O") interface 200. I/O interface 200 can be any type of interface capable of receiving information over a network, such as an Ethernet interface, a wireless networking interface, a fiber-optic networking interface, a modem, and the like. Server 102 also includes a processing device 202 and memory 204. A bus system 206, including, for example, a data bus and a motherboard, can be used to establish and to control data communication between the components of server 102.

Processing device 202 can include one or more microprocessors. Generally, processing device 202 can include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 202. These computer programs include instruction generator 106 and library 208, each of which are described in further detail below.

Instruction generator 106 can be implemented in software running on a computer device (e.g., server 102), hardware or a combination of software and hardware. Although instruction generator 106 is shown as a single module in FIG. 1, functionality of instruction generator 106 can exist in one or more modules, which can be distributed and coupled by one or more networks (not shown).

As previously described, instruction generator 106 can be configured to generate transfer instructions 122 in a predefined programming language, including, e.g., the C++® programming language, the Java® programming language, the Python® programming language, and the like. In an example, instruction generator 106 includes library 208, which can store syntaxes for various programming languages. In the example of FIG. 2, library 208 includes a library for the C++® programming language. In this example, instruction generator 106 generates transfer instructions 122 using library 208 for the syntax of the C++® programming language ("C++® syntax").

In an example, instruction generator 106 can parse the contents of transfer request 120, including, e.g., the syntax keywords, the syntax operations, the syntax structure, the syntax fields, and the like. Using the parsed contents, instruction generator 106 can determine that transfer request 120 includes a request to copy the value (e.g., "x") of field 114 in data structure 110 to field 118 in data structure 112.

In an example, instruction generator 106 can determine that transfer request 120 includes a request for transfer instructions 122 written in the C++® programming language, for example, as illustrated in Table 1 by the header section of transfer request 120. In this example, instruction generator 106 can access library 208 to generate transfer instructions 122 that are in accordance with the syntax of the C++® programming language.

In this example, instruction generator 106 also can determine that transfer request 120 includes a request to copy the value (e.g., "x") of field 114 in data structure 110 to field 118 in data structure 112, based on the copy instruction included in transfer request 120, namely, "ProtocolBuffer112.field118=ProtocolBuffer110.field114," as illustrated in the above Table 1. In this example, instruction generator 106 can convert the copy instruction included in transfer request 120 to a C++® syntax, for example, using library 208 to determine a syntax for a copy instruction in the C++® programming language. Instruction generator 106 uses library 208 to convert the copy instruction included in transfer request 120 into a C++® syntax, namely, "to.set_field120(from.field114)," as illustrated in the above Table 2.

In an example, instruction generator 106 also can use library 208 to generate in the C++® syntax a conditional statement specifying that the value of field 114 in data structure 110 is greater than zero for the value of field 114 to be transfer to field 118 in data structure 112. In this example, instruction generator 106 uses the syntax of conditional statements for the C++® programming language, as specified in library 208, to generate the conditional statement "if (from.field114_size( )>0)," as illustrated in the above Table 2.

Figure 3:
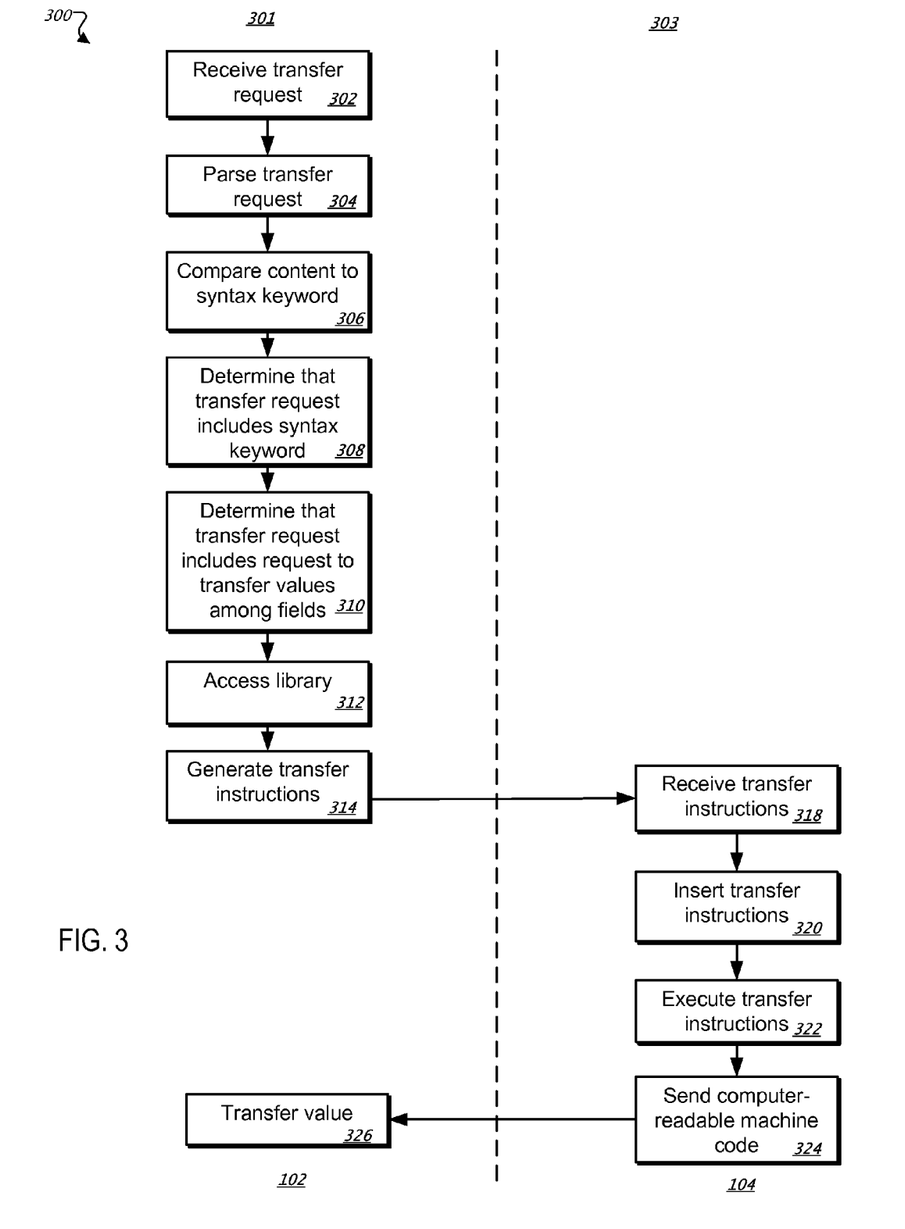
FIG. 3 is a flow chart of an example process for generating transfer instructions for the transfer of values among fields in protocol buffers.

FIG. 3 is a flow chart of an example process 300 for generating transfer instructions 122 for the transfer of values among fields in protocol buffers. In FIG. 3, process 300 is split into a left part 301, which is performed on server 102, and a right part 303, which is performed on client device 104. In an example, left part 301, or a portion thereof, is performed by instruction generator 106.

In operation, instruction generator 106 can receive (302) transfer request 120. Instruction generator 106 can parse (304) transfer request 120, for example, to determine the syntax of and the contents of transfer request 120. Instruction generator 106 compares (306) the contents of transfer request 120 to a syntax keyword (e.g., the "Message Transfer" syntax keyword).

Using the results of the comparison, instruction generator 106 can determine (308) that transfer request 120 includes the syntax keyword. Using the syntax keyword in transfer request 120, instruction generator 106 can determine (310) that transfer request 120 includes a request to transfer values among fields in data structures. In an example, instruction generator 106 can determine that transfer request 120 includes a request to copy the value (e.g., "x") of field 114 in data structure 110 to field 118 in data structure 112, as illustrated in Table 1.

Instruction generator 106 can access (312) library 208. Using library 208, instruction generator 106 can generate (314) transfer instructions 122. In an example, instruction generator 106 can generate transfer instructions 122 by using library 208 to convert the content included in transfer request 120 to instructions that are readable by client device 104 executing a programming language (e.g., the C++® programming language), as described above. Instruction generator 106 can send (not shown) transfer instructions 122 to client device 104.

Client device 104 can receive (318) transfer instructions 122. Following receipt of transfer instructions 122, client device 104 can insert (320) transfer instructions 122 into a computer program, for example, as described below.

In an example, a user of client device 104 can use client device 104 to write the computer program. In this example, the user wants to insert into the computer program instructions that transfer the value of field 114 in data structure 110 to field 118 in data structure 112. In this example, transfer instructions 122 include the instructions to transfer the value of field 114 in data structure 110 to field 118 in data structure 112.

Transfer instructions 122 can be inserted into the computer program executable by client device 104 in numerous ways. In an example, client device 104 can include an application (not shown) that enables the user of client device 104 to generate transfer request 120 and to send transfer request 120 from within the computer program. The application can be configured to receive transfer instructions 122 from server 102 and to insert transfer instructions 122 into the computer program. In another example, a user of client device 104 can manually insert transfer instructions 122 into the computer program.

Client device 104 can execute (322) transfer instructions 122. In this example, client device 104 can execute transfer instructions 122 by compiling the computer program into which transfer instructions 122 were inserted. Compilation of the computer program can generate computer-readable machine code that can be executed by server 102. Client device 104 can send (324) to server 102 the computer-readable machine code. Server 102 can execute the computer-readable machine code and transfers (326) the value ("x") of field 114 in data structure 110 to field 118 in data structure 112.

In another example, instruction generator 106 and library 208 are embodied on client device 104. In this example, actions 302, 304, 306, 308, 310, 312, 314 and 326 (or any combination thereof) can be performed by client device 104. Compilation of the computer program that includes transfer instructions 122 can generate computer-readable machine code that can be executed by client device 104. In this example, execution of the computer-readable machine code by client device 104 can transfer the value ("x") of field 114 in data structure 110 to field 118 in data structure 112.

Using the techniques described herein, instruction generator 106 can generate transfer instructions for transferring values among fields in protocol buffers. In an example, the transfer instructions can specify that a value of one field in a protocol buffer should be copied to another field in another protocol buffer. In another example, the transfer instructions can specify that an operation (e.g., an additive operation and/or a multiplicative operation) should be performed on a value of a field in a protocol buffer. In this example, following performance of the operation, the value can be transferred to another field in another protocol buffer. In still another example, the transfer instructions can be specific to a predefined programming language.

Figure 4:
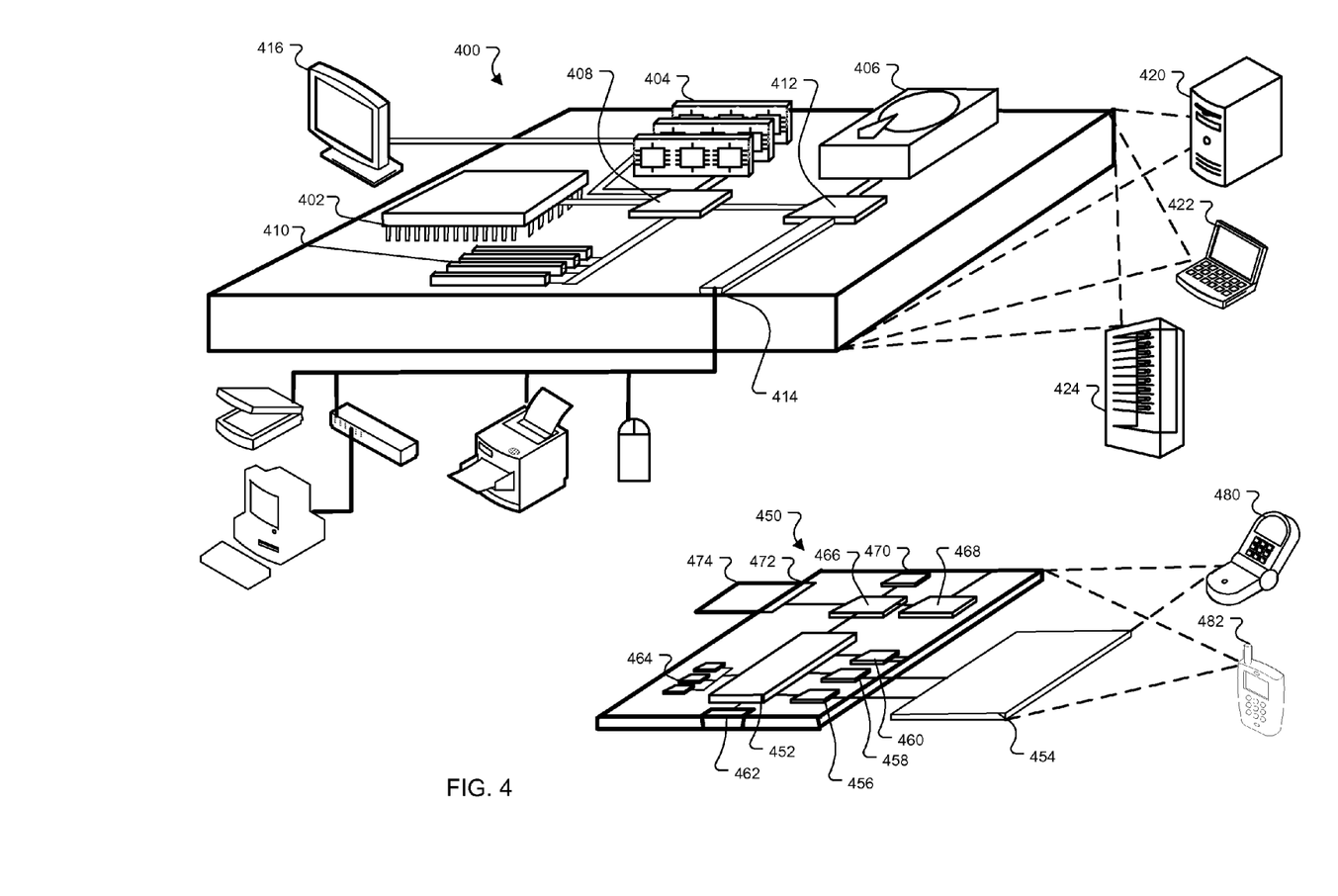
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multi-processor system).

Memory 404 stores information within computing device 400. In one implementation, memory 404 is a volatile memory unit or units. In another implementation, memory 404 is a non-volatile memory unit or units. Memory 404 also can be another form of computer-readable medium, such as a magnetic or optical disk.

Storage device 406 is capable of providing mass storage for computing device 400. In one implementation, storage device 406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product also can contain instructions that, when executed, perform one or more methods, such as those described above. The information carrier is a computer- or machine-readable medium, such as memory 404, storage device 406, memory on processor 402, and the like.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer such as laptop computer 422. In some examples, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes processor 452, memory 464, an input/output device such as display 454, communication interface 466, and transceiver 468, among other components. Device 450 also can be provided with a storage device, such as a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, such as control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other information to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores information within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other information for device 450. Specifically, expansion memory 474 can include instructions to carry out or supplement the processes described above, and can include secure information also. Thus, for example, expansion memory 474 can be provide as a security module for device 450, and can be programmed with instructions that permit secure use of device 450. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken information from a user and convert it to usable digital information. Audio codec 460 can likewise generate audible sound for a user, such as through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the processes and techniques described herein. A number of implementations have been described. Nevertheless, it will be understood that various modifications can be made without departing from the spirit and scope of the processes and techniques described herein. For example, in a variation of FIG. 2, instruction generator 106 can be embodied on client device 104. In this example, client device 104 can generate transfer instructions 122.

In another example, the instructions can be generated before execution of the computer program. In this example, a user of client device 104 can specify how to transfer values of fields among protocol buffers. The user can do so in a file that is sent to server 102 for the generation of instructions. Instruction generator 106 can then generate instructions (e.g., transfer instructions 122) and send the instructions to client device 104. In another example, instruction generator 106 can generate a link to the instructions and can send client device 104 the link to the instructions. The link can then be inserted into the computer program that is executable by client device 104.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising:
    receiving, from a client device, (i) first information indicative of a selection of one or more first fields of a first data structure, (ii) second information indicative of another selection of one or more second fields of a second data structure, and (iii) a request to generate code for populating the one or more selected first fields of the first data structure with one or more first values that are at least partly based on one or more second values in the one or more selected second fields of the second data structure, with the request being received by a server device, and wherein the one or more first fields of the first data structure differ from the one or more second fields of the second data structure;

generating the requested code for insertion into a computer program, with the requested code being generated by the server device and being based on the request, the one or more selected first fields and the one or more selected second fields;

following execution, by the client device, of the code inserted into the computer program:
  receiving, by the server device, computer-readable machine code that was generated through compilation of the computer program by the client device;
  executing, by the server device, the computer-readable machine code;
  selecting, based on executing by the server device, the one or more second values in the one or more second fields of the second data structure; and
  transferring the one or more selected second values to the one or more selected first fields of the first data structure.

2. The method of claim 1, further comprising:
determining a syntax for the request, wherein the syntax comprises a keyword that uniquely identifies the request.

3. The method of claim 2, further comprising:
detecting the keyword in the request; and
following detection of the keyword, generating one or more instructions for the code.

4. The method of claim 1, further comprising:
performing one or more operations on the selected one or more second values.

5. The method of claim 4, wherein the one or more operations comprise one or more of a copy operation, a read operation, a write operation, or an operation that generates a derivative value of the selected one or more second values.

6. The method of claim 1, wherein generating comprises generating, using a library of syntaxes, one or more instructions for the code in accordance with a syntax of a pre-defined programming language.

7. The method of claim 1, wherein the first data structure comprises a first protocol buffer and wherein the second data structure comprises a second protocol buffer that is different from the first protocol buffer.

8. The method of claim 1, wherein the first data structure is accessed by a first software program, and wherein the second data structure is accessed by a second software program that differs from the first software program.

9. A method comprising:
sending, by a client device to a server device, (i) first information indicative of a selection of one or more first fields of a first data structure, (ii) second information indicative of another selection of one or more second fields of a second data structure, and (iii) a request to generate code for populating the one or more selected first fields of the first data structure with one or more first values that are at least partly based on one or more second values in the one or more selected second fields of the second data structure, wherein the one or more first fields of the first data structure differ from the one or more second fields of the second data structure;

receiving, by the client device from the server device, the requested code for insertion into a computer program, with the requested code being generated by the server device and being based on the request, the one or more selected first fields and the one or more selected second fields;
inserting, by the client device, the code into the computer program for execution by the client device;
executing, by the client device, the computer program with the code;
following execution, by the client device, of the code inserted into the computer program:
  generating, based on compilation of the computer program by the client device, computer-readable machine code; and
  transmitting, to the server device, the computer-readable machine code for execution by the server device, to cause the server device to:
    (i) select the one or more second values in the one or more second fields of the second data structure; and
    (ii) transfer the one or more selected second values to the one or more selected first fields of the first data structure.

10. One or more non-transitory machine-readable media storing instructions that are executable by one or more processing devices of a server device to perform operations comprising:
receiving, from a client device, (i) first information indicative of a selection of one or more first fields of a first data structure, (ii) second information indicative of another selection of one or more second fields of a second data structure, and (iii) a request to generate code for populating the one or more selected first fields of the first data structure with one or more first values that are at least partly based on one or more second values in the one or more selected second fields of the second data structure, with the request being received by a server device, and wherein the one or more first fields of the first data structure differ from the one or more second fields of the second data structure;

generating the requested code for insertion into a computer program, with the requested code being generated based on the request, the one or more selected first fields and the one or more selected second fields; and following execution, by the client device, of the code inserted into the computer program:
  receiving computer-readable machine code that was generated through compilation of the computer program by the client device;
  executing the computer-readable machine code;
  selecting, based on executing by the server device, the one or more second values in the one or more second fields of the second data structure; and
  transferring the one or more selected second values to the one or more selected first fields of the first data structure.

11. The one or more non-transitory machine-readable media of claim 10, wherein the operations further comprise:
determining a syntax for the request, wherein the syntax comprises a keyword that uniquely identifies the request.

12. The one or more non-transitory machine-readable media of claim 11, wherein the operations further comprise:
detecting the keyword in the request; and
following detection of the keyword, generating one or more instructions for the code.

13. The one or more non-transitory machine-readable media of claim 10, wherein the operations further comprise:
   performing one or more operations on the selected one or more second values.

14. An electronic system comprising:
   one or more processing devices of a server device; and
   one or more machine-readable media storing instructions that are executable by the one or more processing devices to perform operations comprising:
      receiving, from a client device, (i) first information indicative of a selection of one or more first fields of a first data structure, (ii) second information indicative of another selection of one or more second fields of a second data structure, and (iii) a request to generate code for populating the one or more selected first fields of the first data structure with one or more first values that are at least partly based on one or more second values in the one or more selected second fields of the second data structure, with the request being received by a server device, and wherein the one or more first fields of the first data structure differ from the one or more second fields of the second data structure;
      generating the requested code for insertion into a computer program, with the requested code being generated based on the request, the one or more selected first fields and the one or more selected second fields; and
      following execution, by the client device, of the code inserted into the computer program:
         receiving computer-readable machine code that was generated through compilation of the computer program by the client device;
         executing the computer-readable machine code;
         selecting, based on executing by the server device, the one or more second values in the one or more second fields of the second data structure; and
         transferring the one or more selected second values to the one or more selected first fields of the first data structure.

15. The electronic system of claim 14, wherein the operations further comprise:
   determining a syntax for the request, wherein the syntax comprises a keyword that uniquely identifies the request.

16. The electronic system of claim 15, wherein the operations further comprise:
   detecting the keyword in the request; and
   following detection of the keyword, generating one or more instructions for the code.

* * * * *